(12) United States Patent
Brown et al.

(10) Patent No.: US 6,768,326 B2
(45) Date of Patent: Jul. 27, 2004

(54) SIC PHOTODIODE DETECTORS FOR RADIATION DETECTION APPLICATIONS

(75) Inventors: Dale M. Brown, Schenectady, NY (US); Donald T. McGrath, Fort Collins, CO (US); Charles David Greskovich, Schenectady, NY (US); Robert Joseph Lyons, Burnt Hills, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 09/682,636

(22) Filed: Oct. 1, 2001

(65) Prior Publication Data

US 2003/0052701 A1 Mar. 20, 2003

(51) Int. Cl.[7] .............................................. G01R 31/302
(52) U.S. Cl. ..................................... 324/752; 324/158.1
(58) Field of Search .............................. 324/158.1, 752, 324/750, 751, 765; 250/214 R, 214 LA, 339; 356/30, 432

(56) References Cited

U.S. PATENT DOCUMENTS

| | | | | | |
|---|---|---|---|---|---|
| 3,728,029 A | * | 4/1973 | Hirschfeld | ................... | 356/308 |
| 4,816,691 A | * | 3/1989 | Faatz | ....................... | 250/484.5 |
| 5,223,715 A | * | 6/1993 | Taylor | ......................... | 250/343 |
| 5,430,299 A | * | 7/1995 | Bateman et al. | ............ | 250/374 |
| 5,847,397 A | * | 12/1998 | Moustakas | ............. | 250/370.06 |
| 6,239,434 B1 | | 5/2001 | Brown | | |
| 6,310,352 B1 | * | 10/2001 | Gross et al. | ........... | 250/370.11 |

OTHER PUBLICATIONS

Brown, et al., "SiC Flame Sensors for Gas Trubine Control Systems," *Solid–State Electronics*, vol. 42, No. 5, pp. 755–760, 1998.

Schipper, et al., "On the Luminscence of Hafnium Compounds," *Mat. Res. Bull.*, vol. 29, pp. 23–30, 1994.

\* cited by examiner

*Primary Examiner*—Kamand Cuneo
*Assistant Examiner*—Tung X. Nguyen
(74) *Attorney, Agent, or Firm*—Ann M. Agosti; Patrick K. Patnode

(57) ABSTRACT

A radiation detector includes: a scintillator which produces UV photons in response to receiving radiation from a radiation producing source; and, a wide bandgap semiconductor device sensitive to the UV photons produced by the scintillator. The semiconductor device produces an electric signal as a function of the amount of UV photons incident thereon. Preferably, the electric signal is then measure, recorded and/or otherwise analyzed.

23 Claims, 4 Drawing Sheets

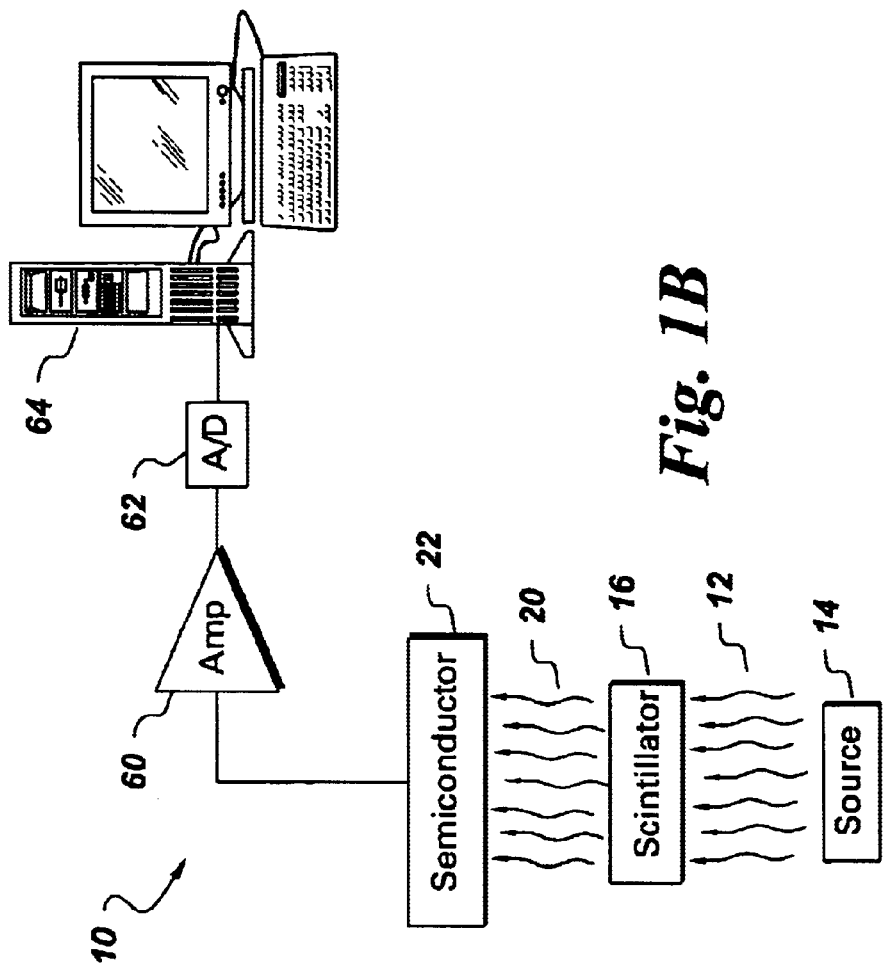
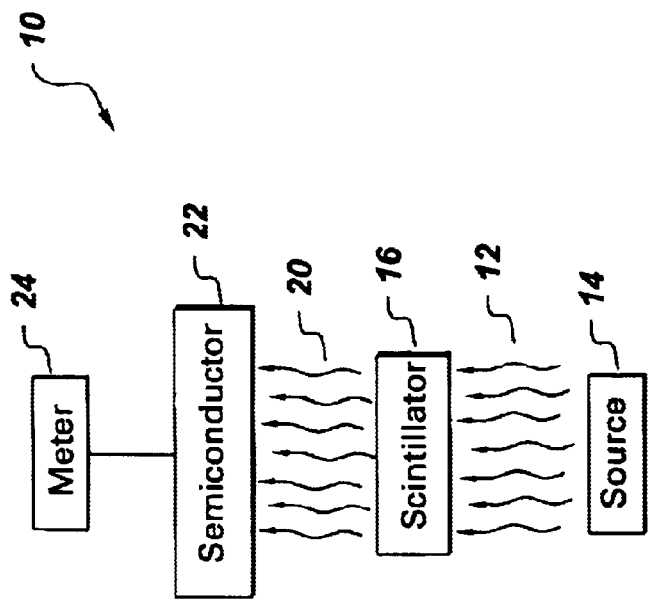

SIC PHOTODIODE DETECTORS FOR RADIATION DETECTION APPLICATIONS

BACKGROUND OF INVENTION

The present invention relates generally to photodiode detectors for radiation detection applications. It finds particular application in conjunction with silicone carbide detectors and will be described with particular reference thereto. It will be appreciated, however, that the invention is also amenable to other like applications.

Present detector systems for computed tomography (CT) use silicon (Si) diodes in combination with a scintillator plate. The scintillator converts x-ray to visible light photons whereupon a Si photodiode converts these photons to photocurrent. There are numerous problems associated with the use of Si photodiodes. Such problems will become limiting factors for future CT machines.

For example, Si diodes are prone to radiation damage. Radiation damage increases dark current, which decreases internal impedance. Decreased internal impedance results in gain changes, increases in noise level, and makes the conversion of photons to hole-electron pairs less efficient.

Future CT will utilize smaller pixels (individual diode areas), which will produce smaller signal levels. Small signal levels mean that the difference between dark current and signal levels will be much smaller. The dark current level produces an offset. Because the signal level will only be a small factor above the dark current, the dynamic range of the system will be compromised.

Present CT machines are working on the edge of thermal drift problems due to changes in the dark current of Si diodes. The offsets need to be constantly monitored before every scan and corrections are then made to the data for anticipated drift during the scan. This problem will be more severe whenever, as planned, a more powerful x-ray tube is utilized.

More rapid scans will be used in advanced CT machines, which will require faster response scintillators. Present scintillators, which have light wavelength output matched to Si, are slow to respond and contain a light output "tail" that decays slowly. Back calculations are required to correct for the slow decay. Consequently, it follows that newer, faster CT machines will require such back calculations to be performed at even faster rates. In fact, the rates at which the back calculations would need to be performed are impractical and, possibly, unachievable.

Oil exploration drilling, for example, uses photo multiplier tubes (PMTs) to detect gamma rays and neutron radiation. This application is similar to the CT application described above in that the detector utilizes a scintillator crystal to convert the gamma and neutron radiation into visible light whereupon the PMT converts this light signal into an electric signal.

The PMTs are extremely expensive and, furthermore, not very reliable (e.g., the failure rate of the PMTs at the bottom of a well near a drill bit is very high). The supply of good PMTs is limited and sorting through hundreds may be required to find a few good ones. Another problem is that the noise of the PMT increases with temperature. Deep hole drilling experiences temperatures as high or higher than 150° C. and the increase in PMT noise makes it more difficult to detect radiation. The low reliability of PMTs significantly contributes to the cost of oil exploration drilling. Therefore, more reliable detectors are desirable.

The present invention provides a new and improved apparatus and method which overcomes the above-referenced problems and others.

SUMMARY OF INVENTION

In accordance with one aspect of the invention, a radiation detector is provided. It includes: a scintillator which produces UV photons in response to receiving radiation from a radiation producing source; and, a wide bandgap semiconductor device sensitive to the UV photons produced by the scintillator. The semiconductor device produces an electric signal as a function of the amount of UV photons incident thereon.

In accordance with another aspect of the invention, the wide bandgap semiconductor device is a SiC, GaN or AlGaN device.

In accordance with a more limited aspect of the invention, the semiconductor device is a photodiode, an avalanche photodiode or an array of the same.

In accordance with another aspect of the invention, the wide bandgap semiconductor device has a dark current of less than or equal to about 1.0 pA/cm$^2$ at about 0.5 VR.

In accordance with yet another aspect of the invention, the wide bandgap semiconductor device has a bandgap greater than or equal to about 2 eV. Preferably, the bandgap is about 3 eV.

In accordance with another aspect of the invention, an output of the UV photons from the scintillator substantially matches a responsivity of the wide bandgap semiconductor device.

In accordance with still another aspect of the invention, the scintillator is any one of a number of UV scintillators such as those including $Li_2HfO_3$, $BaF_2$, CsI, $CeF_3$, $LuAlO_3:Ce^{3+}$, or $Lu_3Al_5O_{12}:Pr^{3+}$.

In accordance with another aspect of the invention, the radiation detected is gamma rays or x-rays. One advantage of the present invention is that it uses a photodiode technology having a relatively large yield (e.g., about 50% to 80%).

Another advantage of the present invention is that it incorporates a photodiode having a relatively wide bandgap.

Another advantage of the present invention is that it produces a relatively low dark current.

Another advantage of the present invention is that, because of the wide bandgap and low dark current, it reduces and/or eliminates detector thermal drift problems and detector noise.

Another advantage of the present invention is that SiC photodiodes are more radiation hard than Si photodiodes.

Still further advantages of the present invention will become apparent to those of ordinary skill in the art upon reading and understanding the following detailed description of the preferred embodiments.

BRIEF DESCRIPTION OF DRAWINGS

The invention may take form in various components and arrangements of components, and in various steps and arrangements of steps. The drawings are only for purposes of illustrating a preferred embodiment and are not to be construed as limiting the invention.

FIGS. 1A and 1B illustrate systems for measuring radiation in accordance with aspects of the present invention.

DETAILED DESCRIPTION

Figure 2:
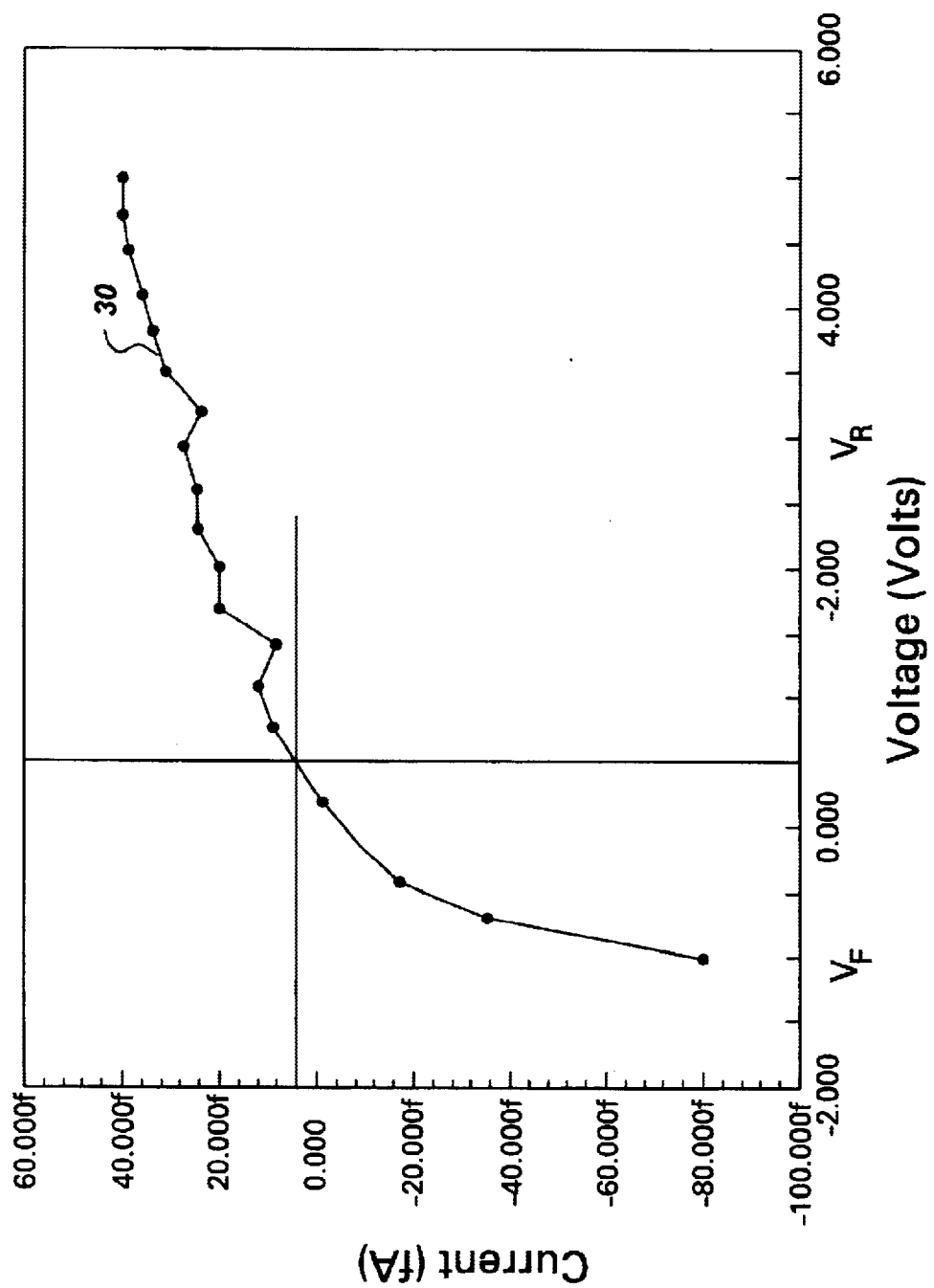
FIG. 2 illustrates a curve representing dark current versus voltage for a SiC photodiode in accordance with aspects of the present invention.
Figure 4:
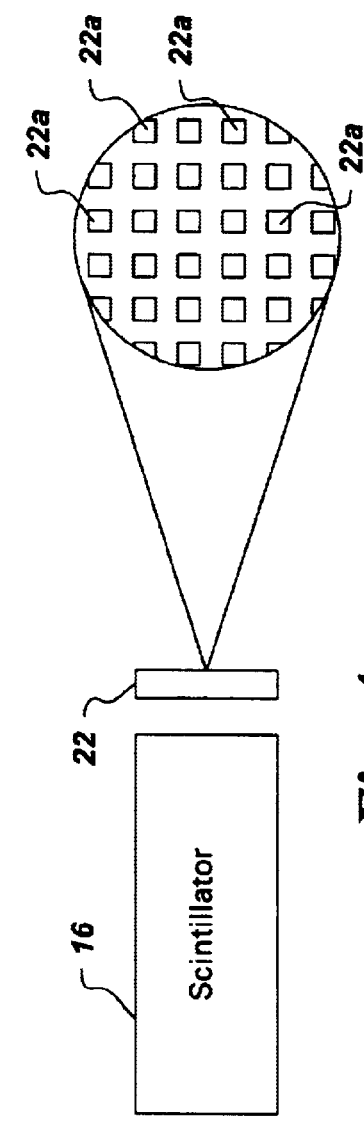
FIG. 4 illustrates an aspect of the present invention wherein a semiconductor device includes an array of photodiodes.

FIG. 1A is a diagrammatic illustration showing a system 10 for measuring radiation 12. The system 10, for example, is a radiation detector. Also shown is a radiation source 14 which produces the high energy radiation 12. The system 10 includes: a scintillator or other like means 16 for converting the radiation 12 incident thereon into ultra-violet (UV) photons 20; a photodetector means 22 for producing an electric current as a function of an amount of UV photons 20 incident thereon; and, a meter 24 which measures the amount of electric current produced by the photodetector means 22. The high energy radiation 12 produced by the radiation source 14 preferably includes gamma rays and/or x-rays. The means 16 receives the radiation 12 from the source 14 and converts the radiation 12 into the UV photons 20. The number of UV photons 20 produced by the means 16 is proportional to the amount of radiation 12 received from the source 14.

In the alternate embodiment shown in FIG. 1B, the electrical signal from the photodetector means 22 is amplified by an amplifier 60. The amplified signal is then routed to an analog-to-digital (A/D) converter 62 which samples the analog signal and generates a digital output data stream therefrom. The output data stream is then sent to a computer 64 for analysis.

The means 16 for converting the radiation 12 into UV photons 20 is preferably a scintillator of the usual type. The scintillator 16 converts the high energy radiation 12 incident thereon into UV photons 20. For example, suitable UV photon producing scintillators include $Li_2HfO_3$, $BaF_2$, CsI, $CeF_3$, $LuAlO_3:Ce^{3+}$, or $Lu_3Al_5O_{12}:Pr^{3+}$. Furthermore, the photodetector means 22 for producing the electric current is preferably a wide bandgap semiconductor device, which is sensitive to energy in the UV region. As used herein, the term "wide bandgap" refers to a bandgap greater than or equal to 2 eV. The bandgap for the semiconductor device 22 is, preferably, about 3 eV.

In a preferred embodiment, the semiconductor device 22 includes silicon carbide (SiC), GaN or AlGaN, and, in this sense, is a SiC, GaN or AlGaN device, respectively. The device 22 is preferably a photodiode or an avalanche photodiode. That is, the semiconductor device 22 is optionally a SiC, GaN or AlGaN photodiode or a SiC, GaN or AlGaN avalanche photodiode, or an array of the same. In any event, the semiconductor device 22 is sensitive to the UV photons produced by the UV scintillator 16. In this manner, the output of the scintillator 16 substantially matches a responsivity of the photodiode 22. Consequently, the semiconductor device 22 produces an electric current or signal as a function of a number of the UV photons 20 received from the scintillator 16 (e.g., the number of UV photons impinging the device 22). Because the scintillator 16 produces a photon flux proportional to the energy of the radiation photon (gamma or x-ray), the output of the semiconductor device 22 is likewise proportional to the radiation energy.

With reference to FIGS. 1 and 2, a curve 30 representing a dark current of the semiconductor 22 versus a voltage shows the semiconductor 22 exhibits a dark current of less than or equal to about $1.0\ pA/cm^2$ at about $0.5\ V_R$ or reverse voltage. Therefore, the photodiode 22 has a relatively low dark current. Furthermore, the yield of the photodiodes 22 is very large (e.g., about 50% to 80%). The use of SiC photodiodes reduces and/or eliminates detector thermal drift and noise problems because the dark current is extremely low because of the wide bandgap (e.g., preferably about 3 eV). Consequently, any increase in dark current is negligible.

FIGS. 3 through 6 illustrate exemplary applications of the present invention. For convenience, components of the embodiments illustrated in FIGS. 3 through 6, which correspond to the respective components of the embodiment illustrated in FIGS. 1A and 1B, are given the same numerical references. New components are designated by new numerals.

Figure 3:
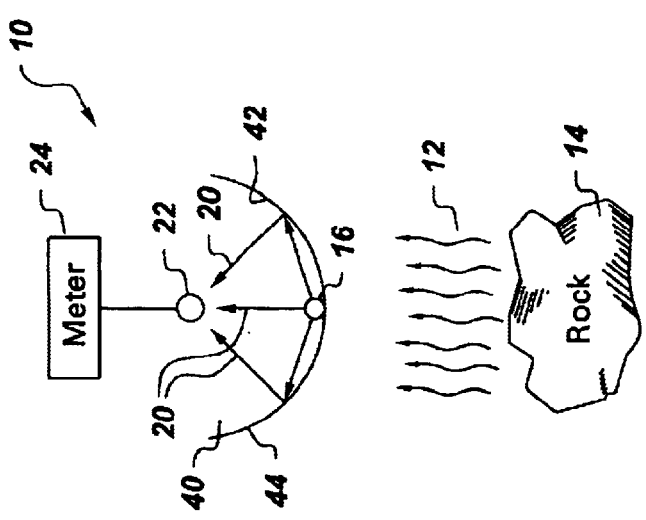
FIG. 3 illustrates one exemplary application of the present invention in connection with an exploratory oil drill apparatus.

With reference to FIG. 3, the system 10 for measuring radiation 12 includes a cavity 40 having a mirrored inner surface 42. In the preferred embodiment, the cavity 40 is defined by a reflector 44 having an ellipsoidal shape. The scintillator 16 is positioned within the reflector 44; the photodetector means 22 is positioned at a focal point of the reflector 44. Such a configuration is used, for example, within an oil drilling exploration application. In this application, the reflector 44 is pointed toward a material (e.g., rock) that is a source 14 of high energy radiation 12 (e.g., gamma rays and/or x-rays). The emission of high energy radiation 12 from rocks and the like is indicative of a sought substance, e.g., oil. More specifically, the higher the level of radiation measured, the more likely it is that oil is present. In this embodiment, the system 10 is contemplated to include a single scintillator 16 and a single device 22 (e.g., a photodiode). However, other configurations are also contemplated. See, e.g., FIG. 4 which shows the semiconductor device 22 as an array of photodiodes 22a abutted directly to the rearward end of the scintillator 16 which faces the radiation source 14.

Figure 5:
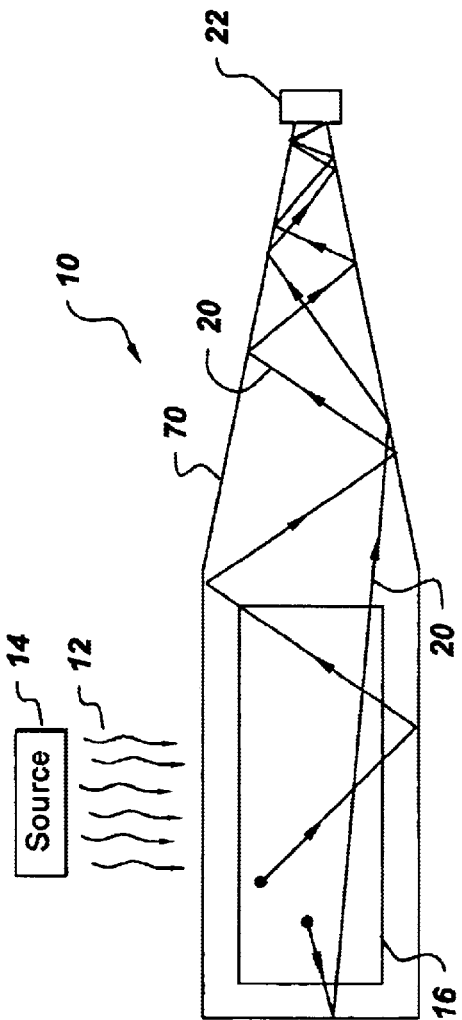
FIG. 5 illustrates an embodiment of the present invention employing a trumpet reflector.

FIG. 5 shows an embodiment of the system 10 which incorporates a trumpet reflector 70 that houses the scintillator 16 at its flared end. The UV photons 20 produced by the scintillator 16 are reflected back and forth off the reflective walls of the trumpet reflector 10. Eventually, the photons 20 are funneled to and/or out the apex of the trumpet reflector 10 where they impinge on the photodetector means 22 positioned there.

Figure 6:
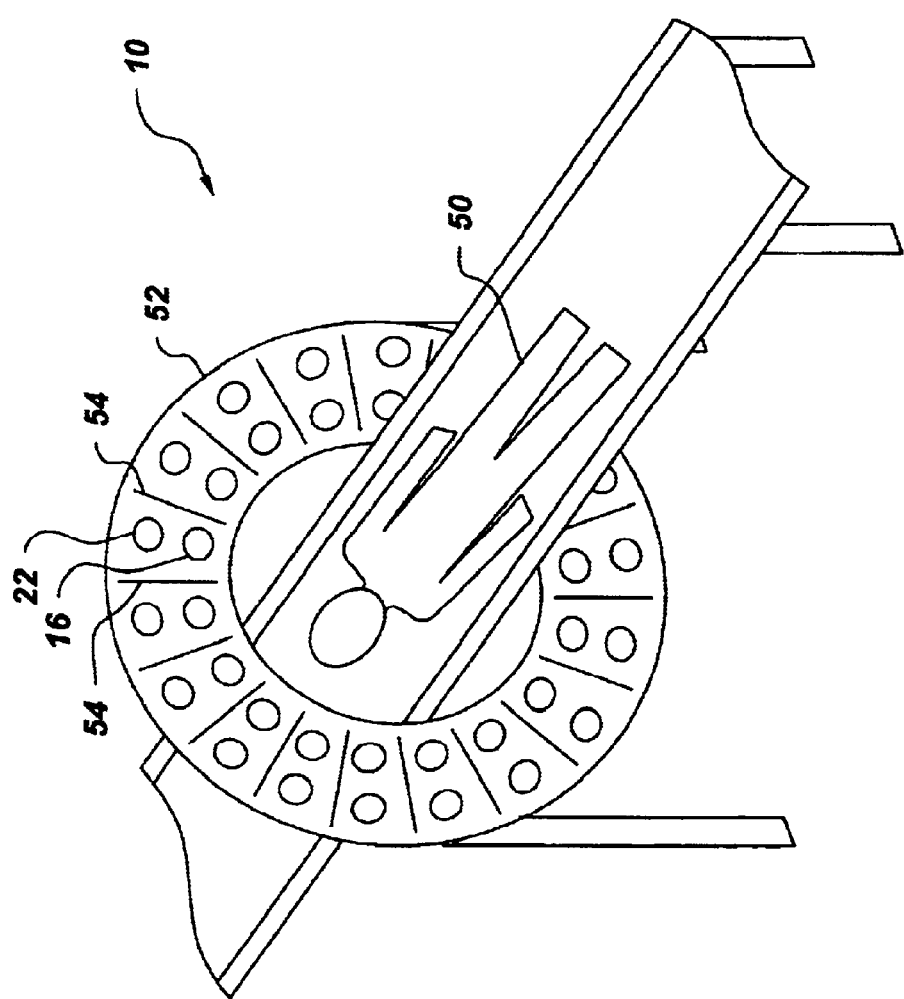
FIG. 6 illustrates another exemplary application of the present invention in connection with a medical imaging apparatus.

With reference to FIG. 6, the system for measuring radiation 10 is shown within a medical imaging environment (e.g., a CT scanner) used for examining subjects 50 (e.g., humans). In the usual manner, the subject 50 is positioned within a volume defined by a gantry 52. A plurality of scintillators 16 and photodetector means 22 are positioned within the gantry 52 and configured to completely or partially surround the subject 50. In this embodiment, the system 10 is contemplated to include a plurality of scintillators 16 and photodetector means 22. Respective pairs of the scintillators 16 and photodetector means 22 are positioned between a plurality of plates 54 (e.g., tungsten plates). However, other configurations are also contemplated. Although it is not illustrated, it is to be understood that a radiation source (e.g., an x-ray tube) is also incorporated into the medical imaging environment in the usual manner.

It is also contemplated to also incorporate the system for measuring radiation of the present invention into other types of imaging scanners (e.g., PET and/or SPECT scanners, nuclear and/or gamma cameras, etc.) and exploratory oil well drilling detectors.

Faster scintillators convert x-rays to UV photons, which matches the UV responsivity of SiC photodiodes. However, it is to be understood that direct conversion without a scintillator is also contemplated.

The invention has been described with reference to the preferred embodiment. Obviously, modifications and alterations will occur to others upon reading and understanding the preceding detailed description. It is intended that the invention be construed as including all such modifications and alterations insofar as they come within the scope of the appended claims or the equivalents thereof.

What is claimed is:

1. A radiation detector, comprising:
   a scintillator which produces UV photons in response to receiving radiation from a radiation producing source; and
   a wide bandgap semiconductor device sensitive to the UV photons produced by the scintillator, said semiconductor device producing an electric signal as a function of the amount of UV photons incident thereon.

2. The radiation detector as at forth in claim 1, wherein the wide bandgap semiconductor device is a SiC, GaN or AlGaN device.

3. The radiation detector as set forth in claim 2, wherein the semiconductor device is a photodiode or an avalanche photodiode.

4. The radiation detector as set forth in claim 3, wherein the semiconductor device is an array of photodiodes or avalanche photodiodes.

5. The radiation detector as set forth in claim 1, wherein the wide bandgap semiconductor device has a dark current less than or equal to about 1.0 pA/cm$^2$ at about 0.5 VR.

6. The radiation detector as set forth in claim 1, wherein the wide bandgap semiconductor device includes a bandgap greater than or equal to about 2 eV.

7. The radiation detector as set forth in claim 1, wherein the wide bandgap semiconductor device includes a bandgap equal to about 3 eV.

8. The radiation detector as set forth in claim 1, wherein an output of the UV photons from the scintillator substantially matches a responsivity of the wide bandgap semiconductor device.

9. The radiation detector as set forth in claim 1, wherein the scintillator includes $Li_2HfO_3$, $BaF_2$, CsI, $CeF_3$, $LuAlO_3:Ce^{3+}$, or $Lu_3Al_5O_{12}:Pr^{3+}$.

10. The radiation detector as set forth in claim 1, wherein the radiation includes at least one of gamma rays and x-rays.

11. A method of detecting radiation, comprising:
    receiving radiation from a source;
    producing UV photons in response to the received radiation;
    directing the UV photons to a wide bandgap semiconductor device which is sensitive to the UV photons; and
    generating an electric signal with the wide bandgap semiconductor device, said signal being a function of the amount of UV photons incident on the semiconductor device.

12. The method of detecting radiation as set forth in claim 11, further including:
    limiting a dark current of the wide bandgap semiconductor device to be less than or equal to about 1.0 pA/cm$^2$ at about 0.5 VR.

13. The method of detecting radiation as set forth in claim 11, wherein a bandgap of the wide bandgap semiconductor device is greater than or equal to about 2 eV.

14. The method of detecting radiation as set forth in claim 11, wherein a bandgap of the wide bandgap semiconductor device is greater than or equal to about 3 eV.

15. The method of detecting radiation as set forth in claim 11, further including:
    substantially matching an output of the UV photons to a responsivity of the wide bandgap semiconductor device.

16. The method of detecting radiation as set forth in claim 11, wherein the wide bandgap semiconductor device includes SiC, GaN or AlGaN.

17. The method of detecting radiation as set forth in claim 11, wherein the UV photons are produces by a scintillator that has the received radiation incident thereon, said scintillator including $Li_2HfO_3$, $BaF_2$, CsI, $CeF_3$, $LuAlO_3:Ce^{3+}$, or $Lu_3Al_5O_{12}:Pr^{3+}$.

18. A system for measuring radiation, comprising:
    means for producing a number of UV photons in response to received radiation, said number of UV photons being proportional to a level of the radiation; and
    wide bandgap semiconductor means for producing an electric signal as a function of the number of the UV photons.

19. The system for measuring radiation as set forth in claim 18, wherein the received radiation is gamma rays or x-rays.

20. The system for measuring radiation as set forth in claim 18, wherein the means for producing the number of UV photons includes a scintillator, said scintillator including $Li_2HfO_3$, $BaF_2$, CsI, $CeF_3$, $LuAlO_3:Ce^{3+}$, or $Lu_3Al_5O_{12}Pr^{3+}$.

21. The system for measuring radiation as set forth in claim 20, the system further including:
    a reflector, said reflector focusing the UV photons from the scintillator onto the means for producing the electric signal.

22. The system for measuring radiation as set forth in claim 18, wherein the system is incorporated into a medical imaging apparatus for monitoring a subject, the system further comprising:
    means for generating radiation; and
    means for producing a number of UV photons in response to received radiation and wide bandgap semiconductor means, paired between partitioning means, said at least one pair configured to receive radiation from the subject.

23. The system for measuring radiation as set forth in claim 18, wherein the system is incorporated into an oil exploration drilling apparatus.

* * * * *